United States Patent
Ankenman et al.

(10) Patent No.: US 10,278,322 B2
(45) Date of Patent: May 7, 2019

(54) HINGED FOLDING TOOLBAR FOR AN AGRICULTURAL IMPLEMENT

(71) Applicant: KUHN KRAUSE, INC., Hutchinson, KS (US)

(72) Inventors: Thomas W. Ankenman, Hutchinson, KS (US); Jesse Nininger, Hutchinson, KS (US)

(73) Assignee: KUHN KRAUSE, INC., Hutchinson, KS (US)

( * ) Notice: Subject to any disclaimer, the term of this patent is extended or adjusted under 35 U.S.C. 154(b) by 138 days.

(21) Appl. No.: 14/977,005

(22) Filed: Dec. 21, 2015

(65) Prior Publication Data

US 2017/0172052 A1 Jun. 22, 2017

(51) Int. Cl.
*A01B 73/04* (2006.01)
(52) U.S. Cl.
CPC ................... *A01B 73/044* (2013.01)
(58) Field of Classification Search
CPC .................................... A01B 73/044
USPC ........................................ 172/311
See application file for complete search history.

(56) References Cited

U.S. PATENT DOCUMENTS

| | | | |
|---|---|---|---|
| 2,735,251 A | 2/1956 | Diugosch | |
| 2,878,043 A * | 3/1959 | Edman et al. | A01B 59/004 403/46 |
| 3,118,507 A | 1/1964 | Oehler et al. | |
| 3,529,674 A * | 9/1970 | Todd et al. | A01B 35/06 16/224 |
| 3,831,685 A | 8/1974 | Birkenbach | |
| 4,232,747 A * | 11/1980 | Pfenninger et al. | A01B 73/044 172/311 |
| 4,320,805 A | 3/1982 | Winter | |
| 4,336,846 A | 6/1982 | Boetto | |
| 4,355,690 A | 10/1982 | Jensen et al. | |
| 4,415,043 A * | 11/1983 | Hadler et al. | A01B 73/044 172/311 |
| 4,441,562 A | 4/1984 | Cooper | |
| 4,529,040 A * | 7/1985 | Grollimund | A01B 73/02 111/57 |
| 6,675,907 B2 * | 1/2004 | Moser et al. | A01B 63/32 111/121 |
| 8,118,110 B2 * | 2/2012 | Tamm et al. | A01B 29/041 172/310 |

(Continued)

*Primary Examiner* — Thomas B Will
*Assistant Examiner* — Joel F. Mitchell
(74) *Attorney, Agent, or Firm* — Oblon, McClelland, Maier & Neustadt, L.L.P.

(57) ABSTRACT

A system of folding toolbars on an agricultural implement having a base toolbar, two articulating toolbars, multiple attachments to the toolbar, and a pair of hinges, with each toolbar connected to attachments. The base toolbar is located orthogonally to the direction of travel of the agricultural implement and connected to a hinge at each end, the hinges are each further connected to an articulating toolbar. Each of the toolbars is connected to a set of attachments. Each articulating toolbar rotates about the base on a pivot axis along the direction of travel of the agricultural implement and tilted relative to the ground plane, such that the center of gravity (CG) moves forward in the transport position and a normal force is applied to the articulating toolbars to resist vertical movement when in field position.

11 Claims, 16 Drawing Sheets

(56) References Cited

U.S. PATENT DOCUMENTS

| | | | |
|---|---|---|---|
| 8,770,309 B2 * | 7/2014 | Bauer | A01B 73/065 111/57 |
| 2007/0169950 A1 * | 7/2007 | Grieshop | A01B 73/044 172/311 |

* cited by examiner

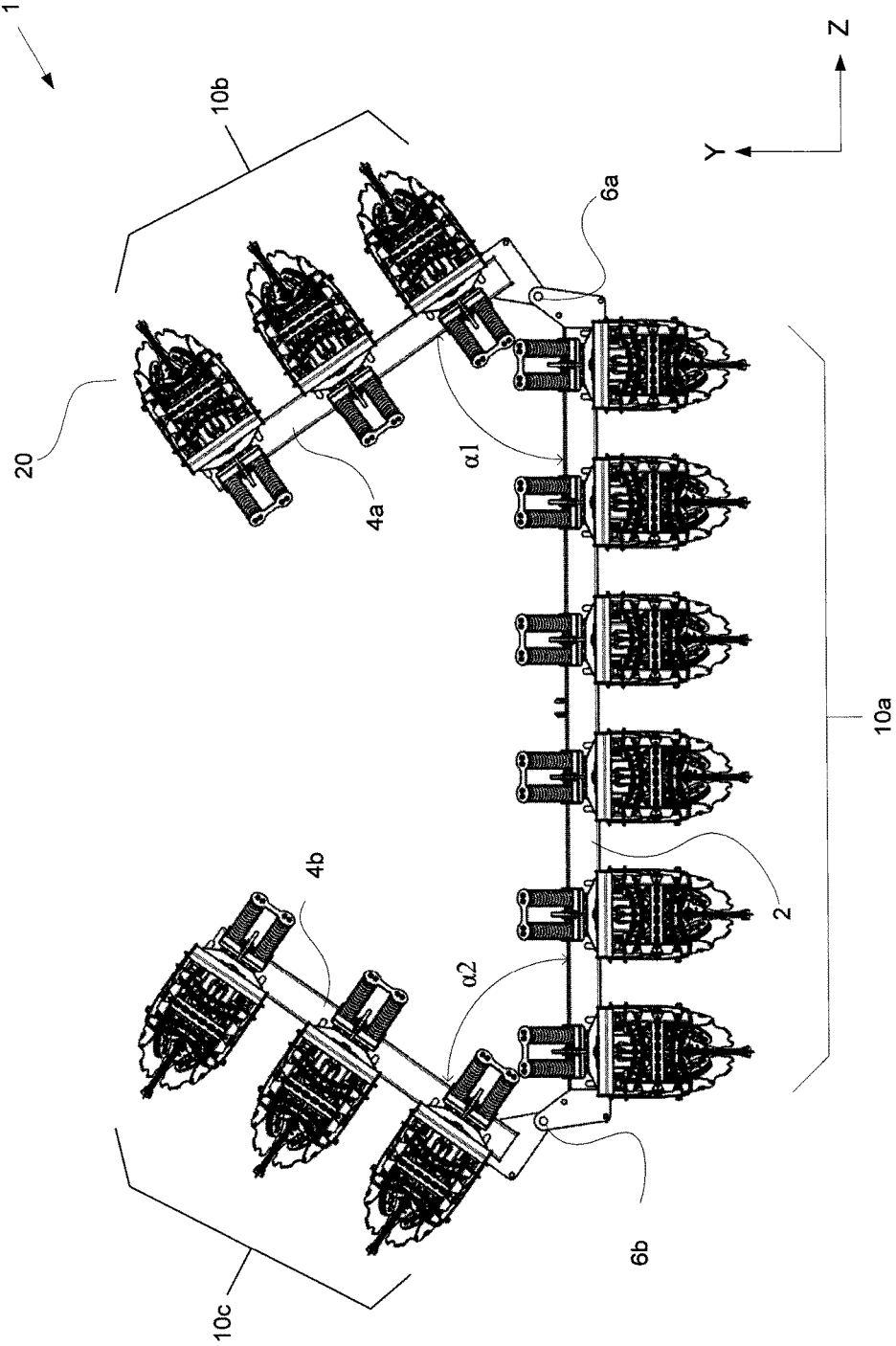

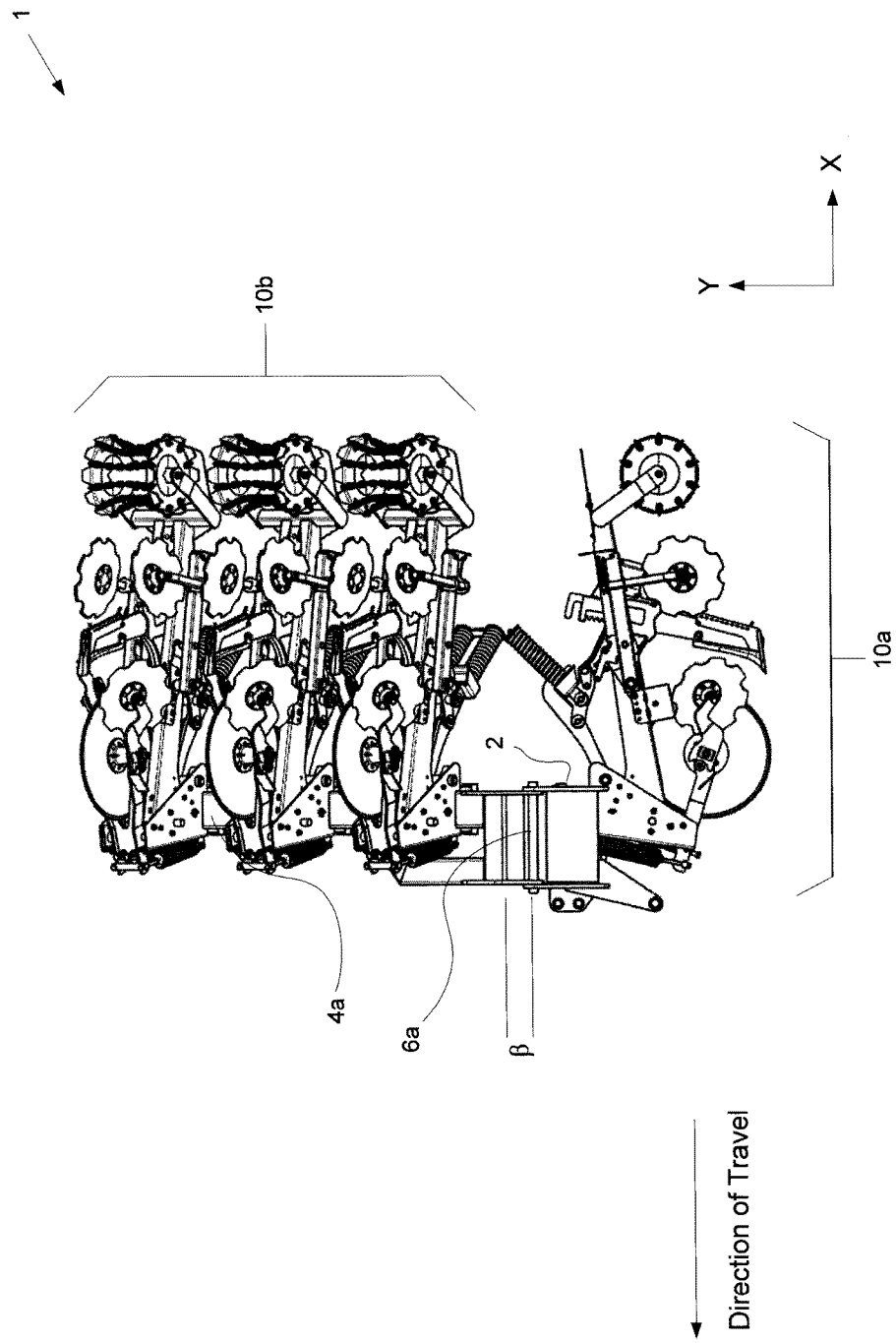

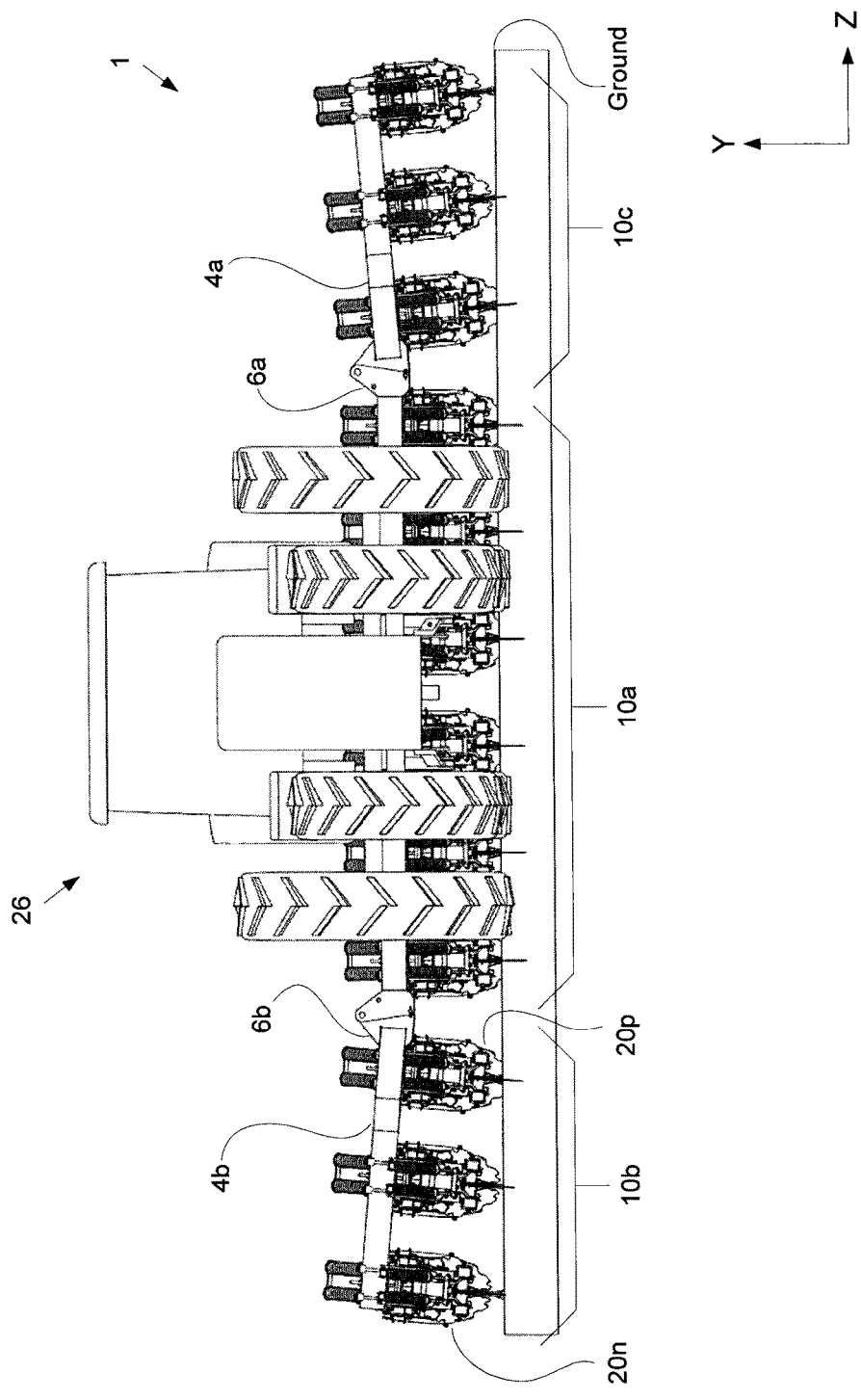

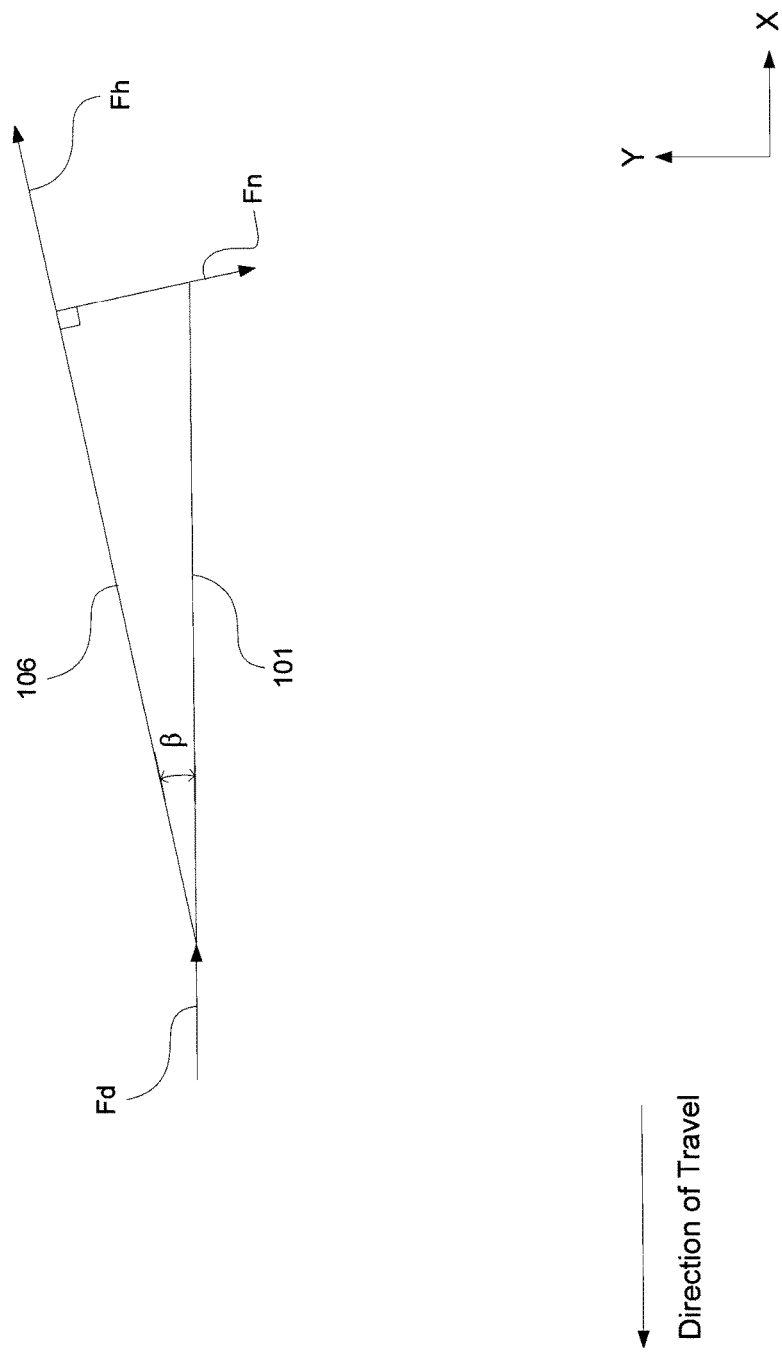

HINGED FOLDING TOOLBAR FOR AN AGRICULTURAL IMPLEMENT

BACKGROUND

Field of the Disclosure

The present disclosure is directed toward a toolbar hinge for an agricultural implement.

Description of the Related Art

The continued need to improve upon the prior art in the field of agricultural implements has resulted in the introduction of a number of folding toolbars, able to be placed in multiple positions to accommodate both operational and transportation requirements.

The art continues to be developed with the aim of improving capabilities of the implements while operating in the field optimizing stability of the implements when in a working position and in a transport position.

Many agricultural implements require lockdown pins to prevent or reduce unintended motion of articulating toolbars as the agricultural implements traverse uneven surfaces or hard to penetrate soils. The positioning of the toolbar on the back of the tractor places a heavy load on the tractor, leading to non-ideal circumstances such as instability, too much rear weight bias, and ultimately reducing the maximum payload the tractor can handle.

Further, conventional embodiments of agricultural implements are not optimal. Despite the need to occupy minimal space during storage, maneuvering, and transit, agricultural implements have relatively large widths in transport positions as a proportion of their dimensions when in working positions during operation. A smaller implement may be required to meet transport or machine storage limitations than required to match the tractor horsepower for field work. The increase in the number of passes needed to work an area directly results in greater fuel, time, and labor requirements than necessary.

FIG. 1A is a perspective view of a conventional embodiment of an agricultural implement 1 including a base toolbar 2, a first articulating toolbar 4a, a second articulating toolbar 4b, a first hinge 6a, a second hinge 6b, lockdown pins 8a and 8b, and three sets of row units 10a, 10b, and 10c, each including a plurality of row units 20 for strip tilling a ground surface. This embodiment illustrates strip till row units mounted to the toolbars. Other attachments may be used. The agricultural implement 1 is shown in a first position with the first articulating toolbar 4a and the second articulating toolbar 4b extended outwardly, substantially parallel to the ground (x-z) plane with the base toolbar 2 having a first end connected to the first hinge 6a and having a second end connected to the second hinge 6b. The base toolbar 2, the first articulating toolbar 4a, and the second articulating toolbar 4b are each connected to a set of row units 10a, 10b, and 10c, respectively. The first articulating toolbar 4a and the second articulating toolbar 4b are connected to the first hinge 6a and the second hinge 6b, respectively.

FIG. 1B and FIG. 1C are close-up perspective views of the connection between the base toolbar 2 and the first articulating toolbar 4a by the first hinge 6a, the first hinge 6a including a lockdown pin 8a. FIG. 1B illustrates the direction of insertion of the lockdown pin 8a into the first hinge 6a. FIG. 1C shows the lockdown pin 8a inserted into the first hinge 6a, preventing rotation of the hinge 6a and preventing the position of the first articulating toolbar 4a from changing relative to that of the base toolbar 2.

FIG. 2A is a perspective view of the conventional embodiment of the agricultural implement 1 including the base toolbar 2, the first articulating toolbar 4a, the second articulating toolbar 4b, the first hinge 6a, the second hinge 6b, and the three sets of row units 10a, 10b, and 10c. The agricultural implement 1 is shown in a second position with the first articulating toolbar 4a and the second articulating toolbar 4b folded, the base toolbar 2 having a first end connected to the first hinge 6a and having a second end connected to the second hinge 6b. The first articulating toolbar 4a articulates about the first end of the base toolbar 2 as both the first articulating toolbar 4a and the base toolbar 2 are connected by the first hinge 6a, and the second articulating toolbar 4b articulates about the second end of the base toolbar 2 as both the second articulating toolbar 4b and the base toolbar 2 are connected by the second hinge 6b. The rotation of the first hinge 6a and the second hinge 6b occur substantially about the x-axis. The ranges of motion of the first articulating toolbar 4a and the second articulating toolbar 4b about the first hinge 6a and the second hinge 6b, respectively, are limited due to the placement of the sets of the row units 10a, 10b, and 10c on the base toolbar 2, the first articulating toolbar 4a, and the second articulating toolbar 4b, respectively.

As the first articulating toolbar 4a articulates about the first hinge 6a from the first (extended, working) position of the agricultural implement 1 to the second (folded, transport) position of the agricultural implement 1 (folded), the set of row units 10a, specifically a row unit 20a, connected to the base toolbar 2 and the set of row units 10b, specifically a row unit 20b, connected to the first articulating toolbar 4a come into contact, limiting articulation of the first articulating toolbar 4a about the base toolbar 2.

As the second articulating toolbar 4b articulates about the second hinge 6b from the first position of the agricultural implement 1 (extended) to the second position of the agricultural implement 1 (folded), the set of the row units 10a connected to the base toolbar 2 and the set of the row units 10c connected to the second articulating toolbar 4b come into contact, limiting articulation of the second articulating toolbar 4b about the base toolbar 2.

FIG. 2B is a front view of the conventional embodiment of the agricultural implement 1 including the base toolbar 2, the first articulating toolbar 4a, the second articulating toolbar 4b, the first hinge 6a, the second hinge 6b, and the three sets of row units 10a, 10b, and 10c, each having a plurality of the row units 20. The agricultural implement 1 is shown in the y-z plane in a second position with the first articulating toolbar 4a and the second articulating toolbar 4b folded, the base toolbar 2 having a first end connected to the first hinge 6a and a second end connected to the second hinge 6b. The base toolbar 2, the first articulating toolbar 4a, and the second articulating toolbar 4b are connected to the sets of row units 10a, 10b, and 10c, respectively. The first articulating toolbar 4a articulates substantially in the y-z plane about the base toolbar 2 as both the first articulating toolbar 4a and the base toolbar 2 are connected by the first hinge 6a. The second articulating toolbar 4b articulates substantially in the y-z plane about the second end of the base toolbar 2 as both the second articulating toolbar 4b and the base toolbar 2 are connected by the second hinge 6b.

As the first articulating toolbar 4a articulates about the first hinge 6a, contact between the set of the row units 10b of the first articulating toolbar 4a and the set of the row units 10a of the base toolbar 2, as provided in the description of FIG. 2A, prevents further articulation and limits the range of rotation of the first hinge 6a, forming angle α1 of about 55 degrees with the horizontal.

As the second articulating toolbar 4b articulates about the second hinge 6b, contact between the set of the row units 10c of the second articulating toolbar 4b and the set of the row units 10a of the base toolbar 2, as provided in the description of FIG. 2A, prevents further articulation and limits the range of rotation of the second hinge 6b, forming angle α2 of about 55 degrees with the horizontal.

FIG. 2C is a side view of the conventional embodiment of the agricultural implement 1 including the base toolbar 2, the first articulating toolbar 4a, the first hinge 6a, and the sets of the row units 10a and 10b. The agricultural implement 1 is shown in the x-y plane in a second position with the first articulating toolbar 4a folded and connected to the first hinge 6a, the base toolbar 2 having a first end connected to the first hinge 6a. The base toolbar 2 and the first articulating toolbar 4a are connected to the sets of row units 10a and 10b, respectively. The first articulating toolbar 4a articulates about the first end of the base toolbar 2 as both the first articulating toolbar 4a and the base toolbar 2 are connected by the first hinge 6a, with the first hinge 6a rotating substantially about the x-axis, in this embodiment forming a tilt angle β with the horizontal of approximately zero degrees.

As the first articulating toolbar 4a articulates about the first hinge 6a, contact between the set of row units 10b of the first articulating toolbar 4a and the set of the row units 10a of the base toolbar 2, as provided in the description of FIG. 2A, prevents further articulation and limits the range of rotation of the first hinge 6a. Because tilt angle β is zero in this embodiment, the first articulating toolbar 4a moves substantially in the y-z plane as it articulates, the position of the center of gravity (CG) of the agricultural implement 1 along the x-axis remains stationary and does not vary with articulation of the first articulating toolbar 4a.

FIG. 2D is a side view of the conventional embodiment of the agricultural implement 1, shown in the x-y plane in the second (transport) position described by FIG. 2C, and connected to the rear of a tractor 26. The tractor 26 has a wheelbase A spanning the distance between the centers of a front wheel 22 and a rear wheel 24, while the distance B represents the distance from the center of the rear wheel 24 to the CG of the agricultural implement 1 in the transport position.

The combined mass of the tractor 26 and the mass of the agricultural implement 1 are supported by the front wheels 22 and the rear wheels 24. The location of the CG of the tractor 26 is generally within the wheelbase A while the CG of the agricultural implement 1 is behind the centerline of the rear wheel since all of the agricultural implement 1 is connected to and supported at the back of the tractor 26, behind the center of the rear wheel 24. The combined CG of the tractor 26 and the agricultural implement 1 is generally still located within the wheelbase A of the tractor 26, but closer to the rear of the tractor 26 than the CG of just the tractor 26 itself.

FIG. 2E is a front view of the conventional embodiment of the agricultural implement 1 connected to the tractor 26. The agricultural implement 1 is shown in an extended (working) position, with similar components to that described by FIG. 2B, including the base toolbar 2, the first articulating toolbar 4a, the second articulating toolbar 4b, the first hinge 6a, the second hinge 6b, and the three sets of row units 10a, 10b, and 10c, each having a plurality of the row units 20 that contact the ground surface. The agricultural implement 1 exerts a draft load on the tractor 26, draft load defined as the force needed to pull the implement parallel to the direction of travel.

By themselves the first articulating toolbar 4a and the second articulating toolbar 4b, and the set of row units 10b and 10c of the agricultural implement 1 have an undesirable tendency to rise up particularly as the row unit 20 furthest from the first and second hinges 6a and 6b, respectively, encounter hard or slightly uneven ground surfaces during operation behind the tractor 26 due to insufficient downward force acting upon them (e.g. the row unit 20n is not even with the row unit 20p), requiring the use of a lockdown pin 8a and lockdown pin 8b to ensure the toolbars 4a and 4b remain in the necessary extended position, and the sets of row units 10b and 10c connected to the toolbars 4a and 4b remain in contact with a ground surface.

SUMMARY

The present disclosure is directed to an agricultural implement equipped with one or more articulating toolbars designed such that as they each rotate about the pivot axes of hinges the toolbars and their attachments do not make contact with one another.

The disclosure pertains to a system and method for allowing folding toolbars to articulate in such a way to reduce the need for lockdown pins since the tilted hinges provide an additional downward force component due to the draft load acting upon the toolbars, to resist vertical movement of the toolbars as the agricultural implement moves forward. This reduces the tendency for inadvertent movement of the toolbars as the agricultural implement encounters uneven ground surfaces.

Further, this minimizes the cross-sectional area of the agricultural implement, reducing both overall height and overall width, due to their kinematic layout compared with other agricultural implements equipped with folding toolbars. When in a folded transport position the width and height required to transport and store the agricultural implement is less than that which would be required were it not for the novel aspects of this disclosure.

The toolbar hinges described below allow a tractor of a given size the capability to pull a larger toolbar span and to work more acres when extended in the working condition. Consequently, the agricultural implement can cover more acres for a given time period and number of passes, reducing fuel and labor costs and increasing efficiency.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIG. 2B is a front view of an embodiment of a toolbar assembly, according to the conventional art;

FIG. 2C is a side view of an embodiment of a toolbar assembly, according to the conventional art;

FIG. 2E is a front view of an embodiment of an agricultural implement connected to a tractor, according to the conventional art;

FIG. 4F is a force diagram representing a hinge mounted at a tilt angle with a horizontal surface of an agricultural implement.

DETAILED DESCRIPTION OF THE EMBODIMENTS

Figure 1A:
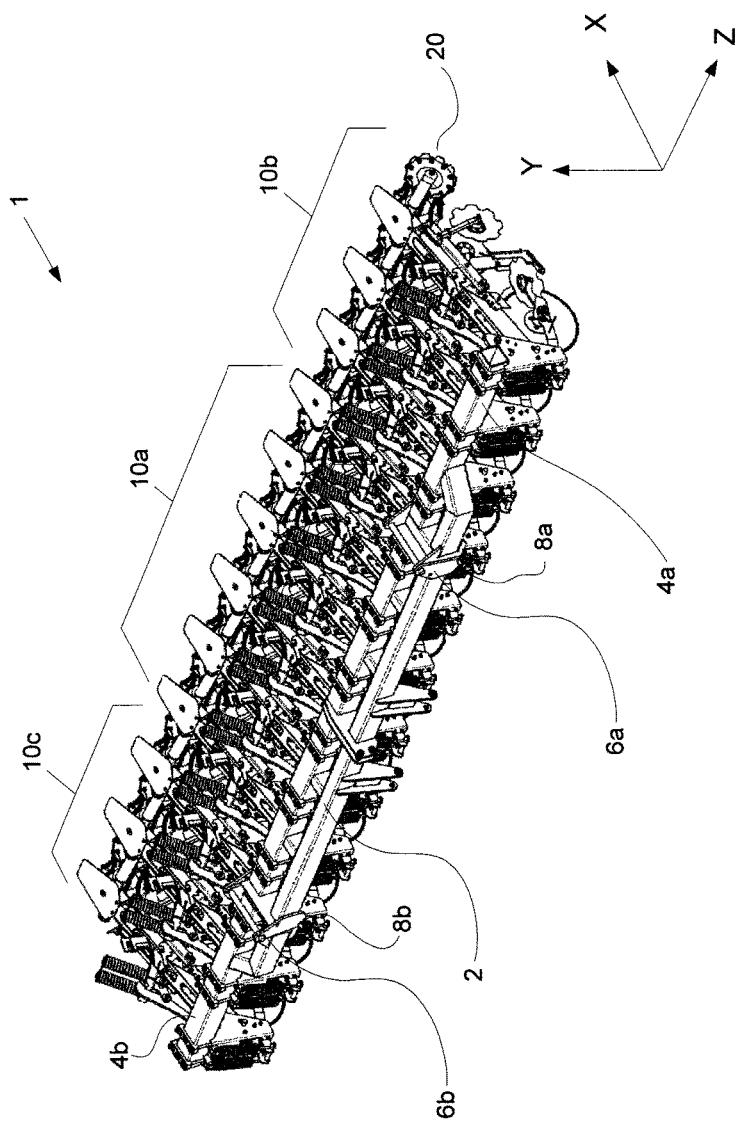
FIG. 1A is a perspective view of an embodiment of a toolbar assembly, according to the conventional art.

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

Figure 3A:
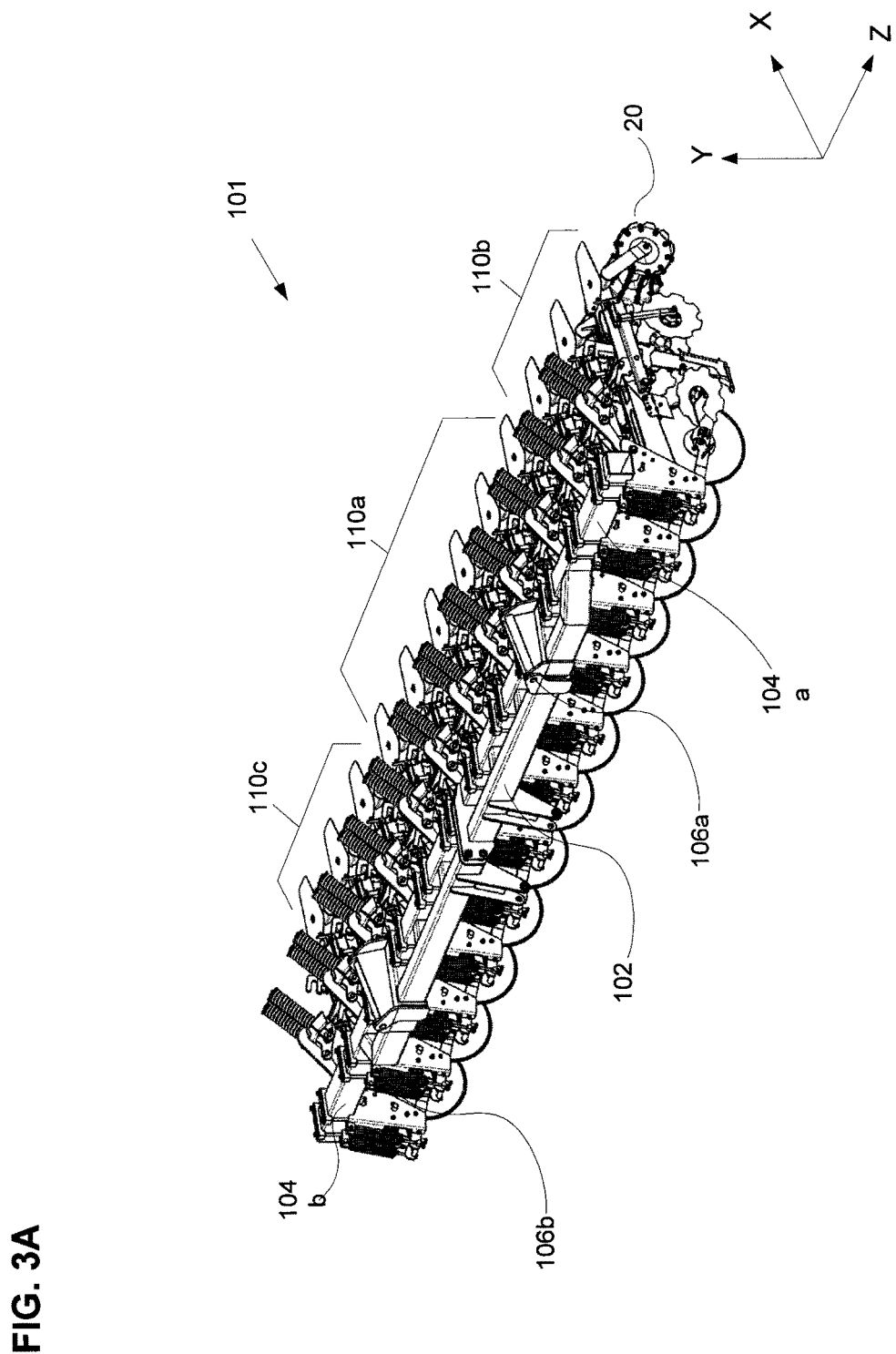
FIG. 3A is a perspective view of an embodiment of a toolbar assembly.

FIG. 3A is a perspective view of an embodiment of an agricultural implement 101 including a base toolbar 102, a first articulating toolbar 104a, a second articulating toolbar 104b, a first hinge 106a, a second hinge 106b, and three sets of row units 110a, 110b, and 110c, each including a plurality of row units 20. This embodiment illustrates strip till row units 110 mounted to the base toolbar 102, the first articulating toolbar 104a, and the second articulating toolbar 104b. Other attachments may be used. The agricultural implement 101 is shown in a first position with the first articulating toolbar 104a and the second articulating toolbar 104b extended outwardly, substantially parallel to the ground (x-z) plane with the base toolbar 102 having a first end connected to the first hinge 106a and a second end connected to the second hinge 106b. The base toolbar 102, the first articulating toolbar 104a, and the second articulating toolbar 104b are connected to the sets of row units 110a, 110b, and 110c, respectively. The first articulating toolbar 104a and the second articulating toolbar 104b are connected to the first hinge 106a and the second hinge 106b, respectively.

Figure 1B:
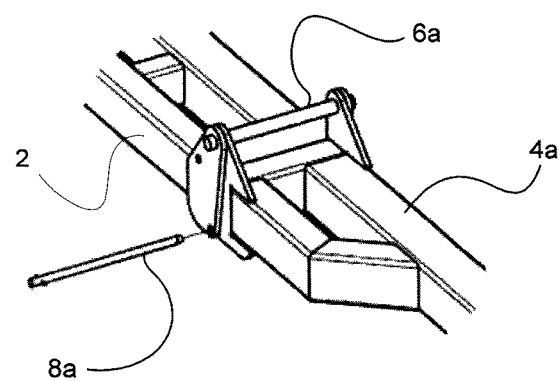
FIG. 1B is a close-up perspective view of an embodiment of a hinge and a lockdown pin, according to the conventional art.
Figure 1C:
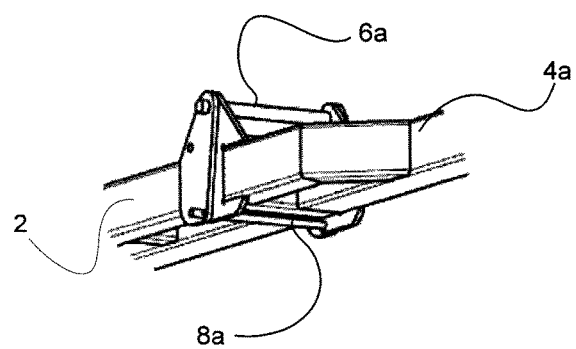
FIG. 1C is a close-up perspective view of a hinge with a lockdown pin inserted, according to the conventional art.
Figure 3B:
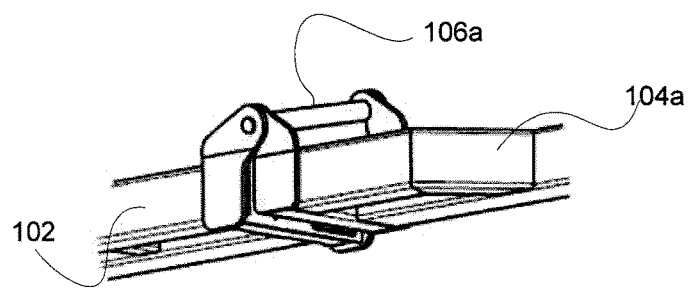
FIG. 3B is a close-up perspective view of an embodiment of a tilted hinge.
Figure 3C:
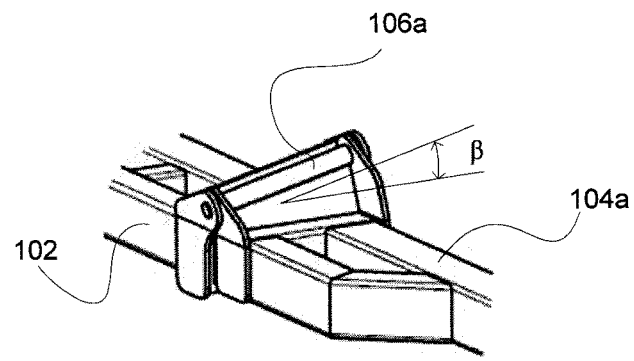
FIG. 3C is a close-up perspective view of an embodiment of a tilted hinge.

FIG. 3B and FIG. 3C are close-up perspective views of the connection between the base toolbar 102 and the first articulating toolbar 104a by the first hinge 106a. FIG. 3B shows the first hinge 106a may not have the lockdown pin 8a of the conventional art, as shown in FIG. 1B and FIG. 1C. FIG. 3C shows the tilt angle β formed by the pivot axis of the first hinge 106a and the ground plane is greater than zero degrees, the pivot axis presenting a tilt angle with the horizontal plane such that the rearward end of the pivot axis is located at a greater distance above a ground plane than a forward end of the pivot axis.

Figure 4A:
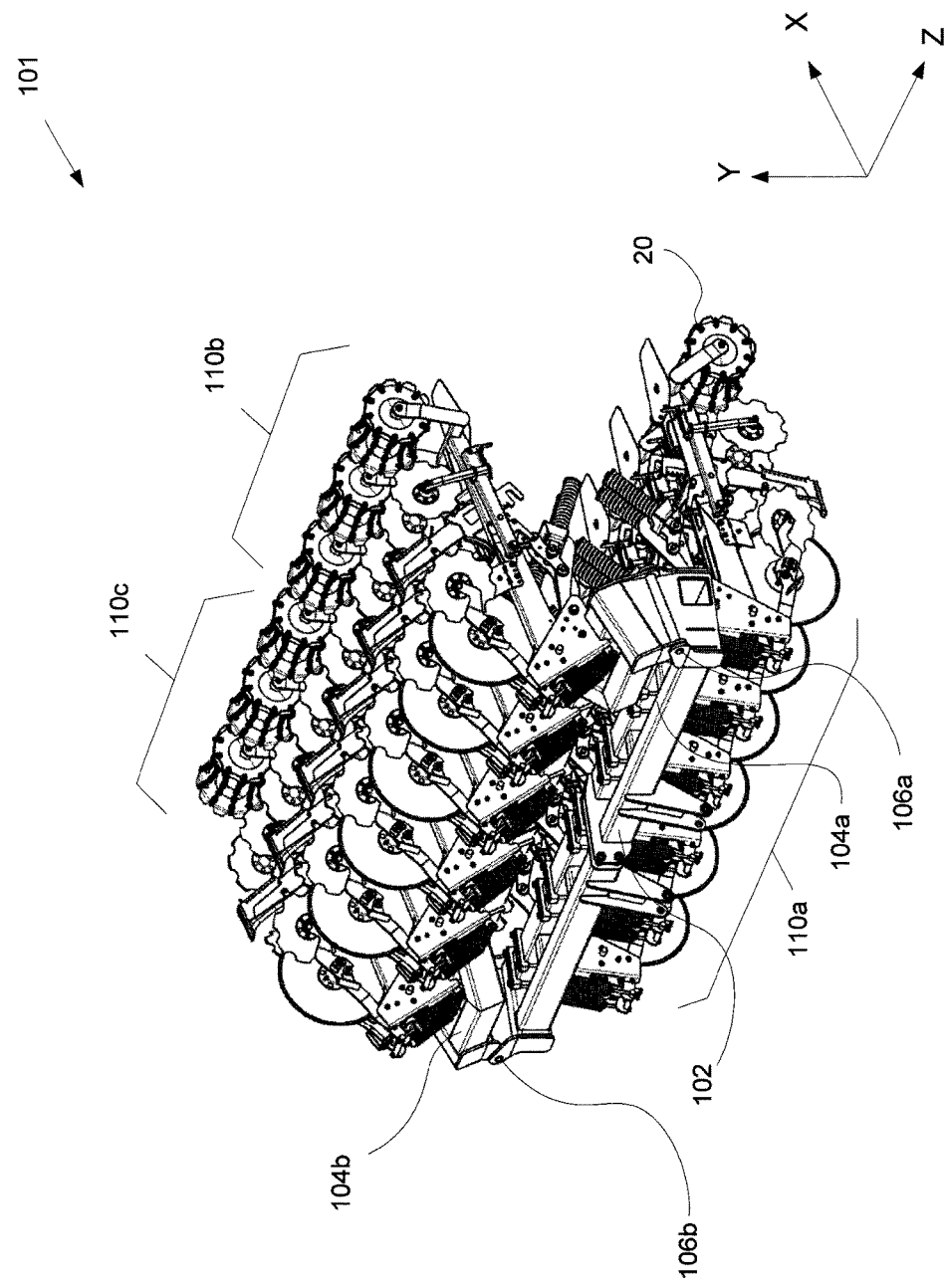
FIG. 4A is a perspective view of an embodiment of a toolbar assembly.

FIG. 4A is a perspective view of an embodiment of the agricultural implement 101 including the base toolbar 102, the first articulating toolbar 104a, the second articulating toolbar 104b, the first hinge 106a, the second hinge 106b, and three sets of row units 110a, 110b, and 110c, as described by FIG. 3A. The agricultural implement 101 is shown in a second (transport) position with the first articulating toolbar 104a and the second articulating toolbar 104b folded, the base toolbar 102 having a first end connected to the first hinge 106a and having a second end connected to the second hinge 106b. The base toolbar 102, the first articulating toolbar 104a, and the second articulating toolbar 104b are each connected to one set of row units 110a, 110b, and 110c, respectively, each having a plurality of row units 20. The first articulating toolbar 104a articulates about the first end of the base toolbar 102 as both the first articulating toolbar 104a and the base toolbar 102 are connected by the first hinge 106a, and the second articulating toolbar 104b articulates about the second end of the base toolbar 102 as both the second articulating toolbar 104b and the base toolbar 102 are connected by the second hinge 106b. The rotation of the first hinge 106a and the second hinge 106b occur about a pivot axis located substantially in the x-y plane.

Figure 2A:
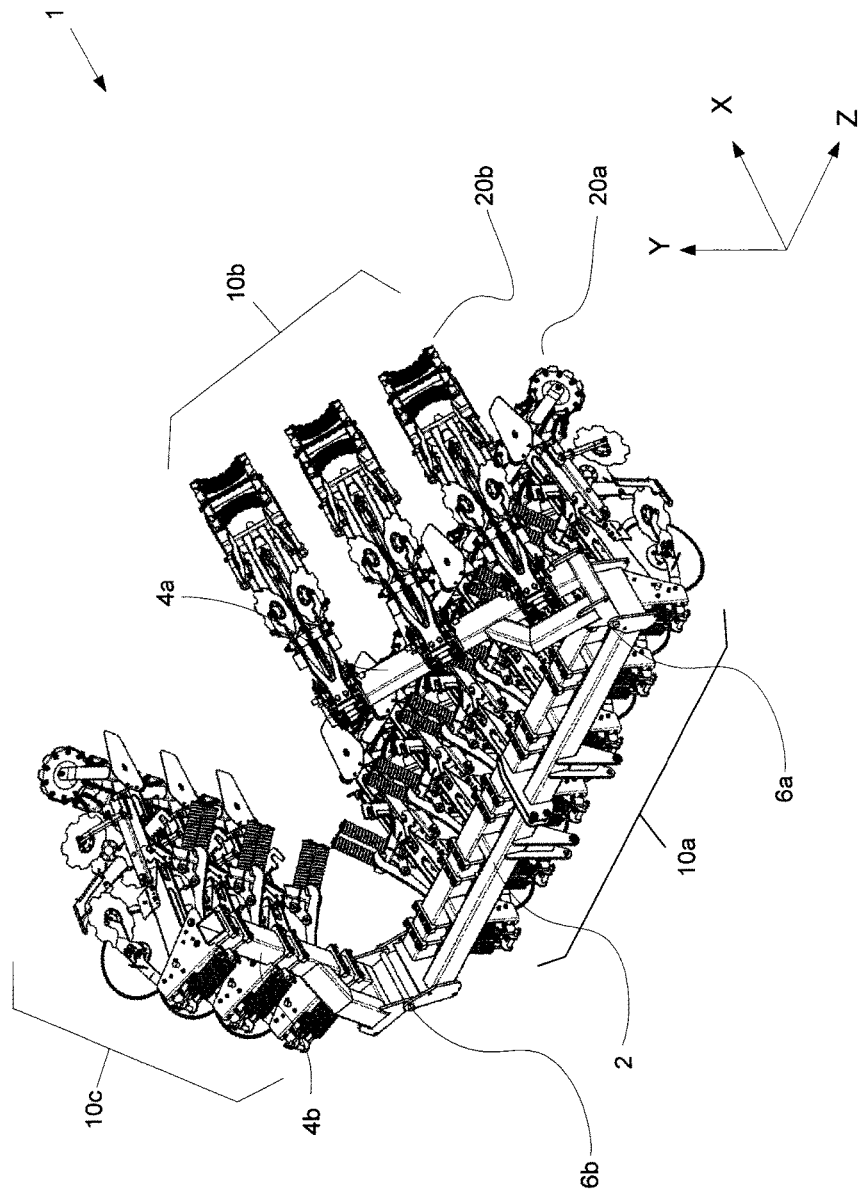
FIG. 2A is a perspective view of an embodiment of a toolbar assembly, according to the conventional art.

In contrast to the conventional embodiment of FIG. 2A, the range of rotation of the first articulating toolbar 104a and the second articulating toolbar 104b about the first hinge 106a and about the second hinge 106b, respectively, as they transition from the first (extended, working) position and approach the second (folded, transport) position, is limited by the independent kinematic relationships between the first articulating toolbar 104a and the base toolbar 102, and the second articulating toolbar 104b and the base toolbar 102, instead of interference between the sets of row units 110c and 110a each is connected to.

This is due to the tilt angle β (FIG. 3C) that exists between each of the pivot axes of the first hinge 106a and the second hinge 106b and the ground plane (x-z plane). Tilt angle β may be approximately in the range of 5 to 15 degrees from the horizontal (x-axis). In one embodiment the tilt angle β may be approximately 8 degrees. In another embodiment the tilt angle β may be approximately 12 degrees. The second hinge 106b is further described by FIG. 4G.

The sets of row units 110b and 110c connected to the first articulating toolbar 104a and the second articulating toolbar 104b, respectively, each travel on different paths than that shown in the conventional embodiment of FIG. 2A, the path of each passing through both the y-z plane and the x-z plane, rather than only in the y-z plane.

Figure 4B:
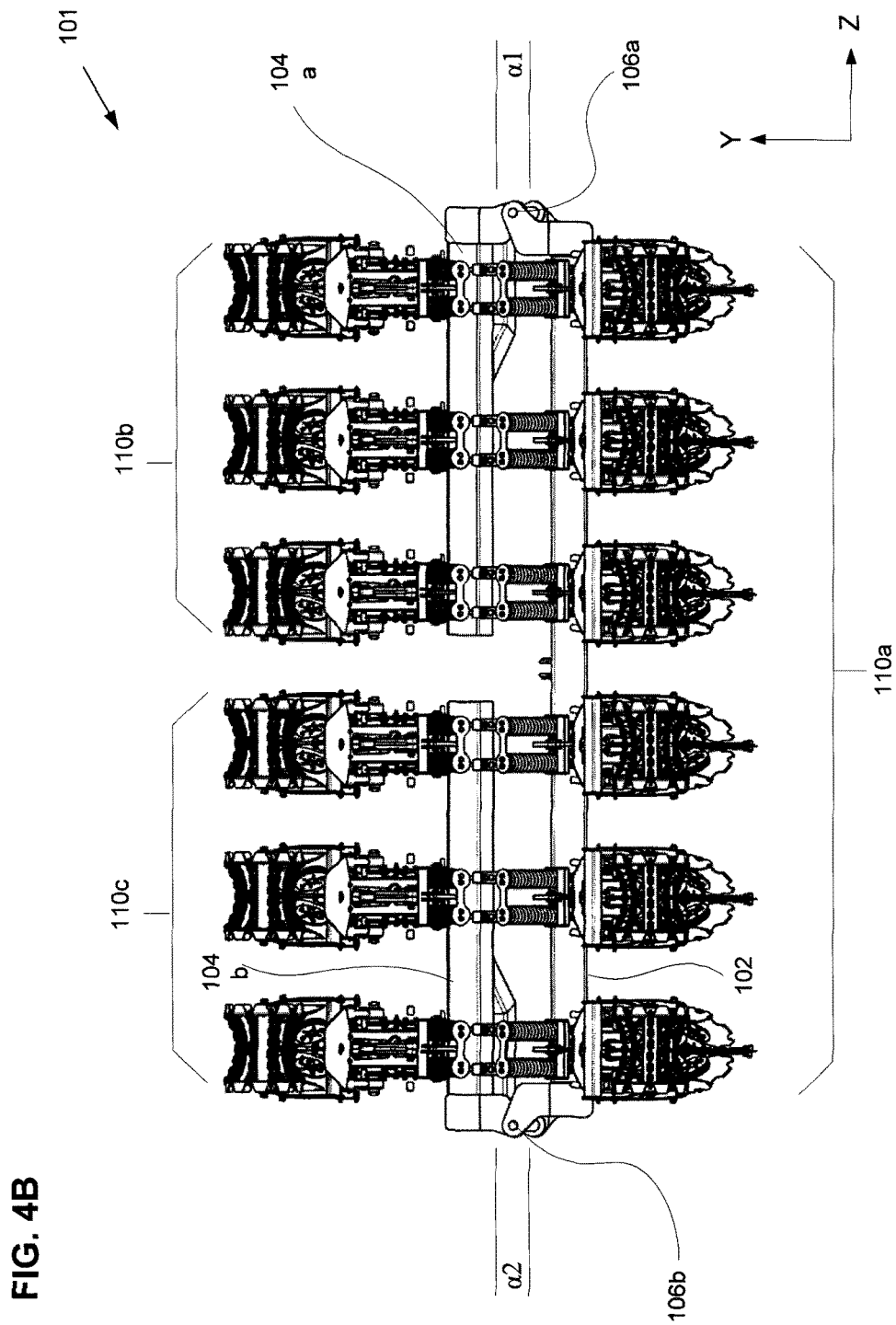
FIG. 4B is a front view of an embodiment of a toolbar assembly.
Figure 4C:
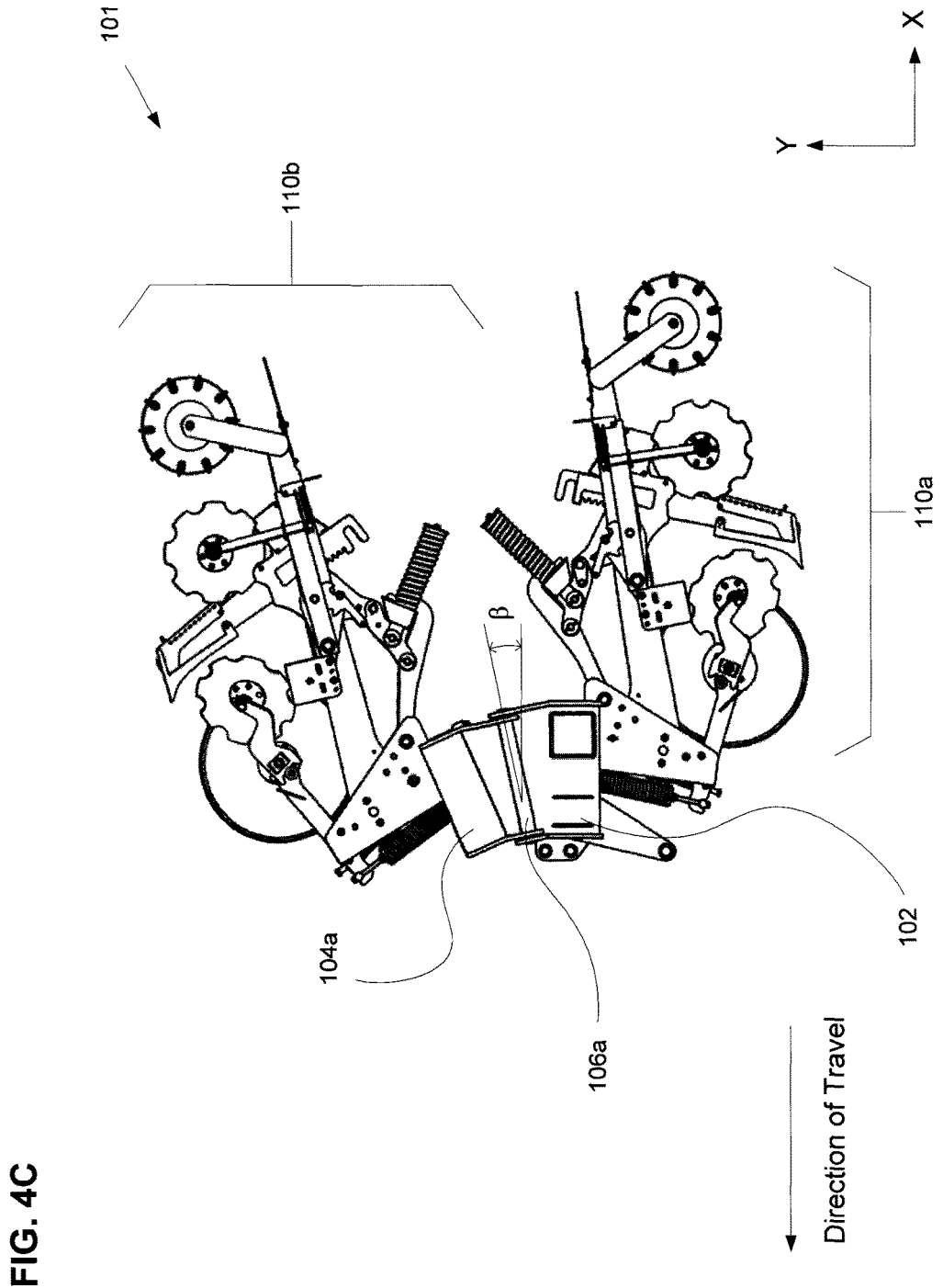
FIG. 4C is a side view of an embodiment of a toolbar assembly.

To maintain the kinematic relationship described by FIG. 4A through FIG. 4C, the combined length of the first articulating toolbar 104a and the second articulating toolbar 104b is not more than the length of the base toolbar 102.

As the first articulating toolbar 104a articulates about the first hinge 106a from the first (extended, working) position of the agricultural implement 101 to the second (folded, transport) position of the agricultural implement 101, the set of row units 110a connected to the base toolbar 102 and the set of row units 110b connected to the first articulating toolbar 104a do not come into contact.

Instead, it is the eventual contact between the base toolbar 102 and the first articulating toolbar 104a or contact between the first articulating toolbar 104a and the first hinge 106a that limits further articulation of the first articulating toolbar 104a about the base toolbar 102, rather than any interference involving the sets of row units 110a and 110b. Because of this the range of rotation of the first hinge 106a is greater in this embodiment than in the conventional embodiment described by FIG. 2A.

The relationship between the base toolbar 102 and the second articulating toolbar 104b is similar. The eventual contact between the base toolbar 102 and the second articulating toolbar 104b or contact between the second articulating toolbar 104b and the second hinge 106b limits further articulation of the second articulating toolbar 104b about the base toolbar 102, rather than any interference involving the sets of row units 110a and 110c. Because of this, the range of rotation of the second articulating toolbar 104b is greater in this embodiment than in the conventional embodiment described by FIG. 2A.

FIG. 4B is a front view of an embodiment of the agricultural implement 101 similar to that shown by FIG. 4A including the base toolbar 102, the first articulating toolbar 104a, the second articulating toolbar 104b, the first hinge 106a, the second hinge 106b, and the three sets of row units 110a, 110b, and 110c. The agricultural implement 101 is shown in the y-z plane in a second position with the first articulating toolbar 104a and the second articulating toolbar 104b folded, the base toolbar 102 having the first end connected to the first hinge 106a and the second end connected to the second hinge 106b. The base toolbar 102, the first articulating toolbar 104a, and the second articulating toolbar 104b are connected to the sets of row units 110a, 110b, and 110c, respectively, each having a plurality of row units 20. The first articulating toolbar 104a articulates primarily in the y-z plane about the first end of the base toolbar 102 as both the first articulating toolbar 104a and the base toolbar 102 are connected by the first hinge 106a, and the second articulating toolbar 104b articulates primarily in the y-z plane about the second end of the base toolbar 102 as both the second articulating toolbar 104b and the base toolbar 102 are connected by the second hinge 106b.

Consequently, in the second (folded, transport) position of the agricultural implement 101 the first articulating toolbar 104a and the second articulating toolbar 104b form angles $\alpha 1$ and $\alpha 2$, respectively, with the ground plane (x-z plane) which are smaller than those of the embodiment of FIG. 2B. For example $\alpha 1$ and $\alpha 2$ are zero degrees when the first articulating toolbar 104a and the second articulating toolbar 104b are each in the second position.

Since tilt angle $\beta$ is greater than zero degrees (FIG. 3C) the first articulating toolbar 104a and second articulating toolbar 104b, and the sets of row units 110b, 110c connected to their respective toolbars, move away from the set of row units 110a connected to the base toolbar 102 as the first articulating toolbar 104a and the second articulating toolbar 104b articulate into the second position, which avoids interference between the three sets of row units 110a, 110b, 110c (see FIG. 4C). The same is true of the relationship between the second articulating toolbar 104b and the base toolbar 102.

FIG. 4C is a side view of an embodiment of the agricultural implement 101 including the base toolbar 102, the first articulating toolbar 104a, and the first hinge 106a. The agricultural implement 101 is shown in the x-y plane in the second (folded, transport) position with the first articulating toolbar 104a folded and connected to the first hinge 106a beneath, the base toolbar 102 having the first end connected to the first hinge 106a. The base toolbar 102 and the first articulating toolbar 104a are connected to the sets of row units 110a, 110b, respectively, each having a plurality of row units 20. The first articulating toolbar 104a articulates about the first end of the base toolbar 102 as both are connected by the first hinge 106a, with the first hinge 106a oriented substantially in the y-z plane and forming the tilt angle $\beta$ that exists between each of the pivot axes of the first hinge 106a and the second hinge 106b and the ground plane (x-z plane). The tilt angle $\beta$ may be approximately in the range of 5 to 15 degrees from the horizontal (x-axis).

As the first articulating toolbar 104a articulates about the first hinge 106a from the first (extended, working) position of the agricultural implement 101 to the second (folded, transport) position of the agricultural implement 101, the set of row units 110a connected to the base toolbar 102 and the set of row units 110b connected to the first articulating toolbar 104a do not come into contact.

As the first articulating toolbar 104a articulates from the first position, in which it is located with the same planar orientation as the base toolbar 102, to the second position in which the first articulating toolbar 104a moves forward of the plane of the base toolbar 102, the sets of row units 110a and 110b to which the base toolbar 102 and the first articulating toolbar 104a, respectively, are connected move apart enough such that there is no contact between the sets of row units 110a and 110b, unlike that described by FIG. 2C. This is due to the forward movement of the first articulating toolbar 104a along the x-axis relative to the base toolbar 102. Thus, the set of row units 110b connected to the first articulating toolbar 104a has sufficient clearance in its range of motion so as not to make contact with the set of row units 110a connected to the base toolbar 102.

Consequently, the CG of the entire agricultural implement 101 moves forward on the x-axis as it transitions from the first, working position to the second, transport position. The pivot axes of the first hinge 106a and the second hinge 106b about which the first articulating toolbar 104a and the second articulating toolbar 104b, respectively, articulate are substantially parallel with the direction of travel and form an tilt angle $\beta$ with the ground (x-z) plane.

Further, the smaller cross section of the second position of the agricultural implement 101 in this embodiment, in both width (z-axis) and height (y-axis), compared with the cross section of the second position of the embodiment described in FIG. 2A through FIG. 2C allows the agricultural implement 101 to maneuver in smaller areas, whether in open space, inside a building or structure, as well as more easily transported on highways.

Figure 4D:
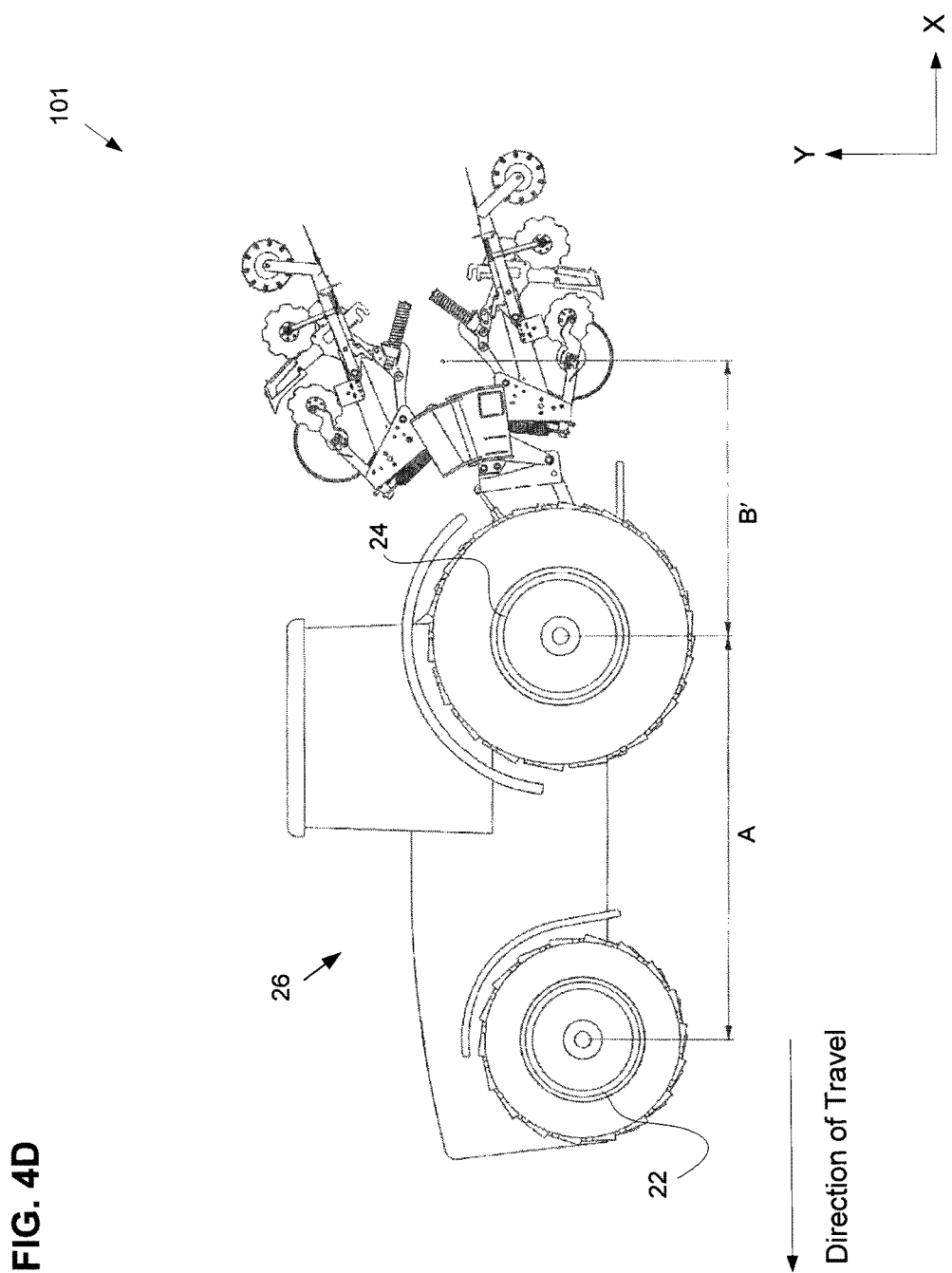
FIG. 4D is a side view of an embodiment of an agricultural implement in a transport position, connected to the rear of a tractor.

FIG. 4D is a side view of an agricultural implement 101, shown in the x-y plane in the second (transport) position described by FIG. 4C, and connected to the rear of a tractor 26. The tractor 26 has a wheelbase A spanning the distance between the centers of a front wheel 22 and a rear wheel 24, while the distance B' represents the distance from the center of the rear wheel 24 to the CG of the agricultural implement 101 in the transport position.

The combined mass of the tractor 26 and the mass of the agricultural implement 101 are supported by the front wheels 22 and the rear wheels 24. The location of the CG of the tractor 26 is generally within the wheelbase A while the CG of the agricultural implement 101 is behind the centerline of the rear wheel since the whole of the agricultural implement 101 is connected to and supported at the back of the tractor 26, behind the center of the rear wheel 24. The combined CG of the tractor 26 and the agricultural implement 101 is generally still located within the wheelbase A of the tractor 26, but closer to the rear of the tractor 26 than the CG of just the tractor 26 itself.

Figure 2D:
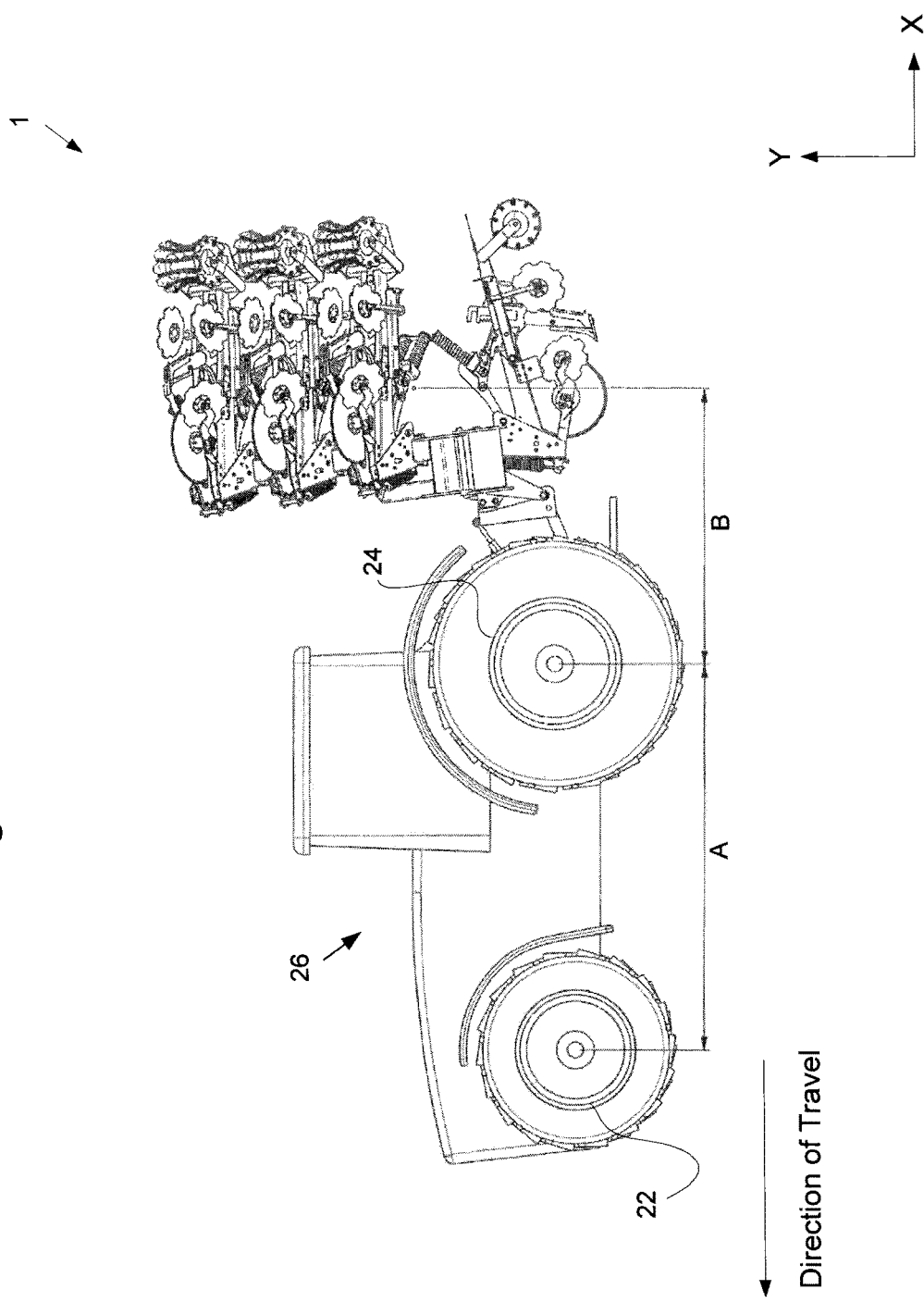
FIG. 2D is a side view of an embodiment of an agricultural implement in the transport position, and connected to the rear of a tractor, according to the conventional art.

However, the payload capability of the tractor 26 in this example is greater than that of the tractor 26 described by the background art of FIG. 2D because B' is shorter in this example than B is in that described by FIG. 2D. The CG of the agricultural implement 101 in this example is closer to that of the tractor 26, reducing the moment the CG of the agricultural implement 101 exerts about the center of the rear wheel 24, reducing the effect that must be counterbalanced by the moment the tractor's 26 CG creates about the center of the rear wheel 24. With the tractor's 26 mass more evenly distributed over the front wheels 22 and the rear wheels 24, in this example the tractor 26 is more stable, consequently allowing the tractor 26 to carry more payload before exceeding the weight limit of the front wheels 22 or the rear wheels 24 than the example described by FIG. 2D.

Figure 4E:
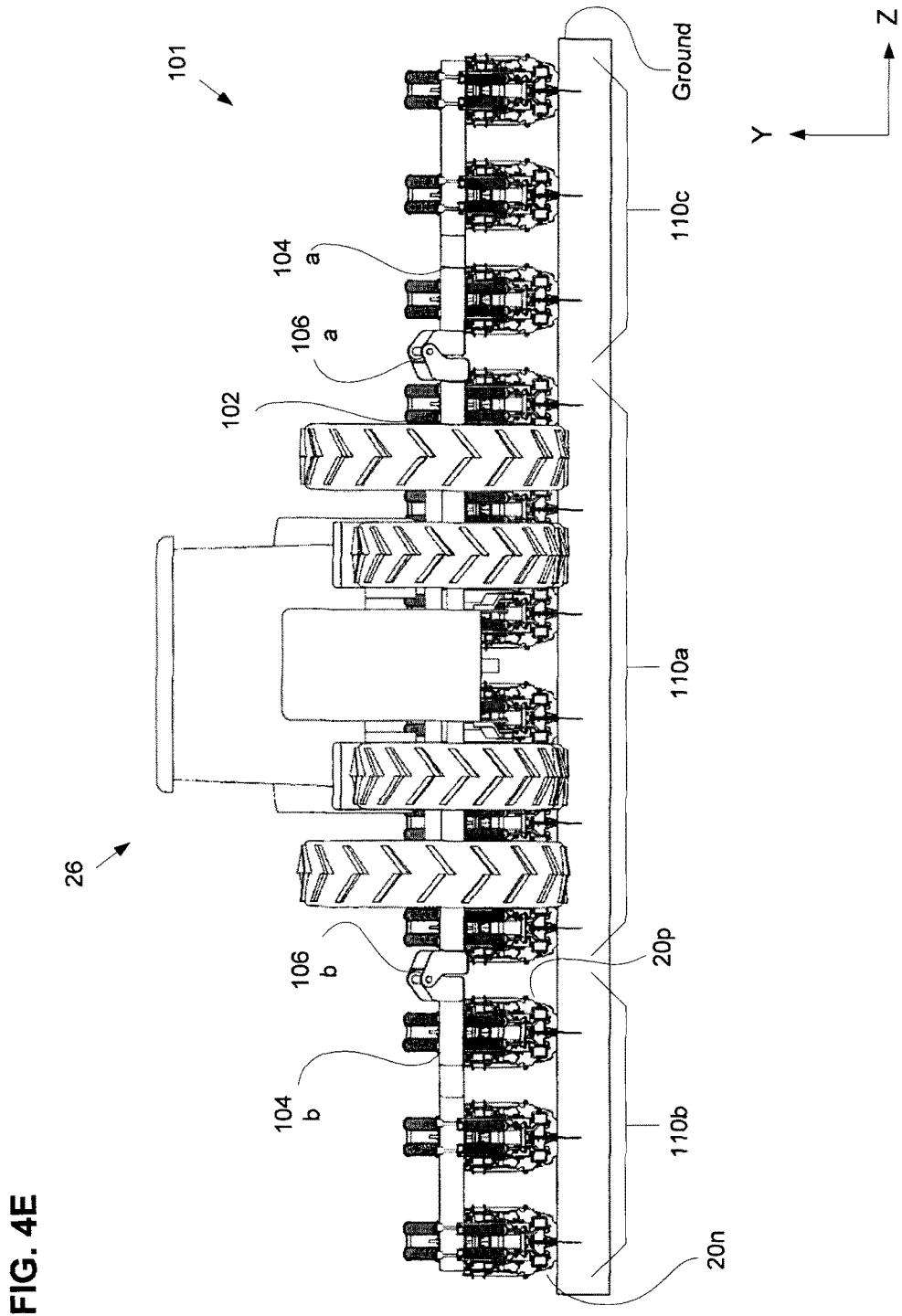
FIG. 4E is a front view of an embodiment of an agricultural implement connected to a tractor.

FIG. 4E is a front view of an embodiment of the agricultural implement 101 connected to the tractor 26. The agricultural implement 101 is shown in an extended (working) position, with similar components to that described by FIG. 4A, including the base toolbar 102, the first articulating toolbar 104a, the second articulating toolbar 104b, the first hinge 106a, the second hinge 106b, and the three sets of row units 110a, 110b, and 110c, each having a plurality of the row units 20 that contact the ground surface. The agricultural implement 101 exerts a draft load on the tractor 26, draft load defined as the force needed to pull the implement parallel to the direction of travel.

Because the first articulating toolbar 104a and the second articulating toolbar 104b, and the respective sets of row units 110b and 110c connected to them are tilted forward, the first articulating toolbar 104a and the second articulating toolbar 104b each have an additional normal force component acting downward due to the draft load which is parallel to the forward direction of travel of the agricultural implement 101. Because the pivot axes of the hinges 106a and 106b are angled tilted forward relative to the ground (x-z) plane at an angle β (FIG. 4C), there exists a normal component of the draft load which restricts vertical movement. This restriction stabilizes the first articulating toolbar 104a and the second articulating toolbar 104b, and reduces the tendency for inadvertent movement of said members relative to the base toolbar 102 when the plurality of the row units 20 of the agricultural implement 101 encounters uneven ground surfaces. Since the first articulating toolbar 104a and the second articulating toolbar 104b are tilted forward in this manner, the need for the agricultural implement 101 to be equipped with lockdown pins 8a and 8b (i.e. the conventional implement shown in FIG. 1A-FIG. 1C) is eliminated.

The set of row units 110c connected to the first articulating toolbar 104a and the set of row units 110b connected to the second articulating toolbar 104b of the agricultural implement 1 tend to remain in place when encountering hard or uneven ground surfaces more than the example of the conventional art described by FIG. 2E. This is because the normal force component exerted by the draft load upon the angled toolbar hinges 106a and 106b results in an additional downward force acting upon the first articulating toolbar 104a and the second articulating toolbar 104b, helping to keep the outer most row units 20 in contact with the ground surface (e.g. the row unit 20n is about even with the row unit 20p).

FIG. 4F is a force diagram representing a hinge 106 mounted at a tilt angle β with a horizontal surface of an agricultural implement 101, similar to that described in FIG. 4C. If the tilt angle β is zero, as in the background art, the draft force Fd is equal to the horizontal force Fh, and there is no additional normal force Fn applied to the hinge 106. If the tilt angle β is greater than zero, an additional normal force Fn is applied to the hinge 106. The normal force Fn is a product of the sine of the tilt angle β and the draft force Fd (Fn=(sin β)×Fd).

In one example, the tilt angle β is equal to 12 degrees and the draft force Fd is 3,000 lbs. The additional normal force Fn=(sin 12 degrees)×3,000 lbs.=624 lbs.

In another example, the tilt angle β is equal to 8 degrees and the draft force Fd is 3,000 lbs. The additional normal force Fn=(sin 8 degrees)×3,000 lbs.=418 lbs.

The additional normal force Fn is applied to both articulating toolbars 104a and 104b, and reduces the need for lockdown pins 8a and 8b, as described by FIG. 1B and FIG. 1C of the background art.

Figure 4G:
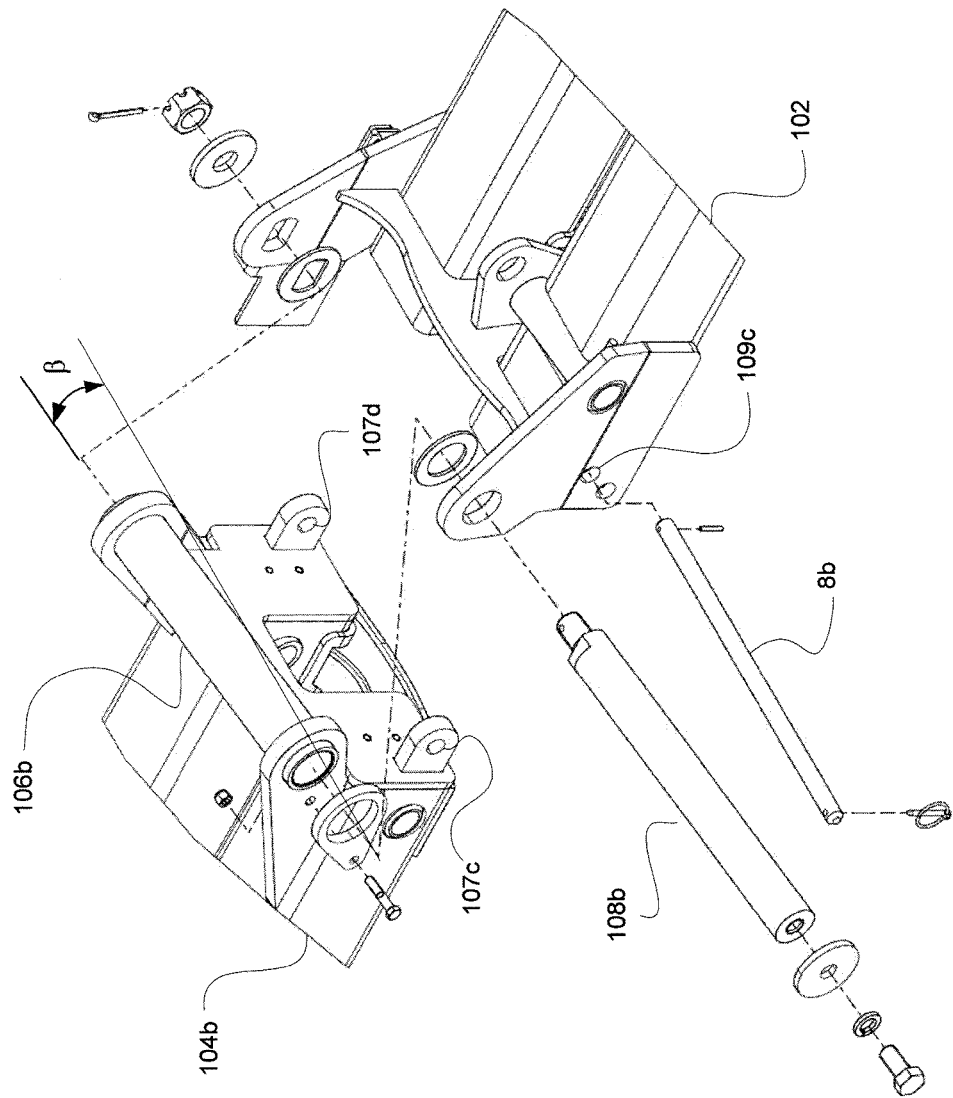
FIG. 4G is an exploded perspective view of an embodiment of the toolbar hinge, connecting the second articulating toolbar and the base toolbar.

FIG. 4G is an exploded perspective view of an embodiment of the toolbar hinge 106b, connecting the second articulating toolbar 104b and the base toolbar 102. A hinge pin 108b disposed inside the second hinge 106b connects the base toolbar 102 to the second articulating toolbar 104b. Further, a lockdown pin 8b may optionally connect bracket holes 107c and 107d, with toolbar holes 109c and 109d, respectively, (the toolbar hole 109d is not visible in this view). In such a case, the lockdown pin 8b connects the second articulating toolbar 104b to the base toolbar 102, and prevents the second articulating toolbar 104b from articulating about the base toolbar 102. Further, as described by FIG. 4A through FIG. 4F, the axis of the 106b forms an angle β with a horizontal plane. The first hinge 106a connects the first articulating toolbar 104a to the base toolbar 102 in the identical manner.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A system of folding toolbars on an agricultural implement comprising:
   a base toolbar including a first set of row units;
   a first articulating toolbar including a second set of row units;
   a first hinge provided on one of a first end of the base toolbar and a first end the first articulating toolbar;
   a first front bracket and a first rear bracket provided on the other of the first end of the base toolbar and the first end of the first articulating toolbar;
   a first hinge pin,
   a second articulating toolbar including a third set of row units;
   a second hinge provided on one of a second end of the base toolbar and a first end of the second articulating toolbar;

a second front bracket and a second rear bracket provided on the other of the second end of the base toolbar and the first end of the second articulating toolbar; and a second hinge pin, wherein the first hinge is disposed between the first front bracket and the first rear bracket in a direction of travel of the agricultural implement, wherein the first hinge pin passes through a first hole provided on the first front bracket, and a second hole provided on the first rear bracket so as to connect the base toolbar and the first articulating toolbar, wherein the base toolbar is located orthogonally to the direction of travel of the agricultural implement, the first articulating toolbar articulates about a pivot axis of the first hinge from a first working position to a second transport position, the pivot axis presenting a tilt angle with a horizontal plane of the base toolbar such that a rearward end of the pivot axis is located at a greater distance above the horizontal plane of the base toolbar than a forward end of the pivot axis, wherein a first fastener is provided at one end of the first hinge pin to keep the first hinge pin in a fixed position in both the first working position and the second transport position of the first articulating toolbar, wherein the second hinge is disposed between the second front bracket and the second rear bracket in the direction of travel of the agricultural implement, wherein the second hinge pin passes through a third hole provided on the second front bracket, the second hinge, and a fourth hole provided on the second rear bracket so as to connect the base toolbar and the second articulating toolbar, and a second fastener is provided at one end of second hinge pin to keep the second hinge pin in a fixed position, and wherein the pivot axis of the first hinge and a pivot axis of the second hinge are substantially parallel and located along the direction of travel of the agricultural implement, such that the first set of row units does not contact the second set of row units throughout a range of motion of the first articulating toolbar, and the first set of row units does not contact the third set of row units throughout a range of motion of the second articulating toolbar, and wherein the base toolbar and the first articulating toolbar are substantially parallel in the second transport position.

2. The system according to claim 1, wherein the tilt angle is approximately in a range of 8 to 12 degrees.

3. The system according to claim 1, wherein the base toolbar and the second articulating toolbar are substantially parallel in the second transport position.

4. The system according to claim 1, wherein the first articulating toolbar and the second articulating toolbar are symmetrical.

5. The system according to claim 1, wherein the first hinge is provided on the first end of the first articulating toolbar, and the first front bracket and the first rear bracket are provided on the first end of the base toolbar.

6. A method for folding toolbars, the method comprising:

connecting a base toolbar and a first articulating toolbar with a first hinge having a pivot axis along a direction of travel of an agricultural implement, with a rearward end of the pivot axis tilted upward, with respect to a horizontal plane of the base toolbar, such that the pivot axis forms a tilt angle with the horizontal plane of the base toolbar; and rotating the first articulating toolbar about the first hinge pivot axis from a first working position to a second transporting position, wherein the first hinge provided on one of a first end of the base toolbar and a first end the first articulating toolbar;

wherein a first front bracket and a first rear bracket are provided on the other of the first end of the base toolbar and the first end of the first articulating toolbar, wherein the first hinge is disposed between the first front bracket and the first rear bracket in the direction of travel of the agricultural implement, wherein a first hinge pin passes through a first hole provided on the first front bracket, and a second hole provided on the first rear bracket so as to connect the base toolbar and the first articulating toolbar, wherein a first fastener is provided at one end of first hinge pin to keep the first hinge pin in a fixed position in both the first working position and the second transport transporting position, and wherein in the second transporting position, the first articulating toolbar is substantially parallel with the base toolbar.

7. The method of claim 6, further comprising setting the tilt angle in a range of approximately 5 to 15 degrees.

8. The method of claim 6, further comprising setting the tilt angle to about 8 degrees.

9. The method of claim 6, further comprising setting the tilt angle to about 12 degrees.

10. The method of claim 6, further comprising moving a center of gravity of the agricultural implement forward in the direction of travel as the first articulating toolbar rotates from the first working position to the second transporting position with respect to the base toolbar.

11. The method according to claim 6, further comprising providing the first hinge on the first end of the first articulating toolbar, and providing the first front bracket and the first rear bracket on the first end of the base toolbar.

* * * * *